Jan. 31, 1933.  G. F. YAGER  1,895,562
FACING AND CHAMFERING MACHINE
Filed July 14, 1930  3 Sheets-Sheet 1

INVENTOR
George F. Yager.
BY Whittemore, Hulbert, Whittemore & Belknap
ATTORNEYS Jan. 31, 1933.   G. F. YAGER   1,895,562
FACING AND CHAMFERING MACHINE
Filed July 14, 1930   3 Sheets-Sheet 2
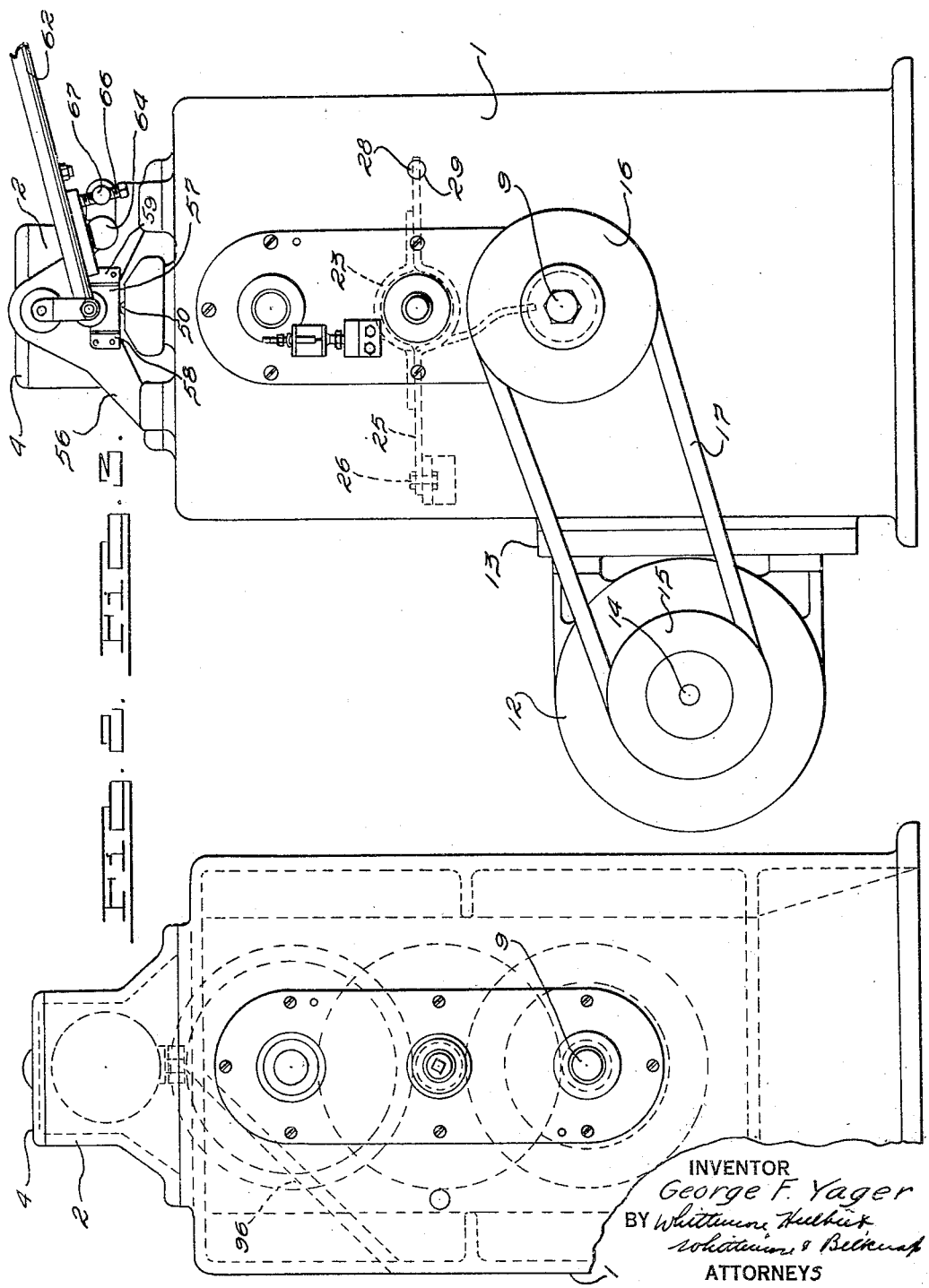
INVENTOR
George F. Yager
BY Whittemore Hulbert
   Whittemore & Belknap
ATTORNEYS Jan. 31, 1933. G. F. YAGER 1,895,562
FACING AND CHAMFERING MACHINE
Filed July 14, 1930 3 Sheets-Sheet 3
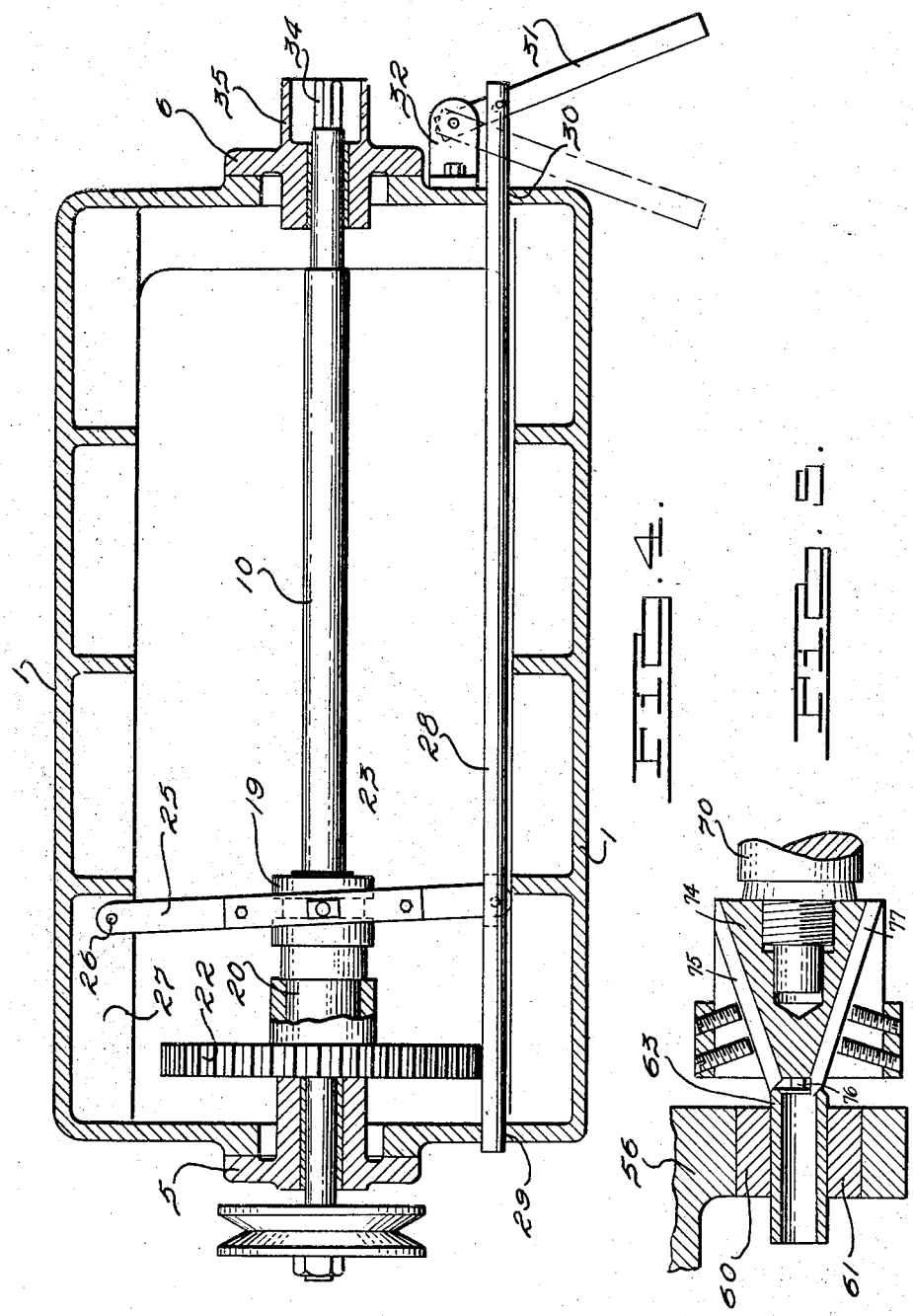
INVENTOR
George F. Yager.
BY Whittemore, Hulbert,
Whittemore & Belknap
ATTORNEYS Patented Jan. 31, 1933

1,895,562

UNITED STATES PATENT OFFICE

GEORGE F. YAGER, OF TOLEDO, OHIO, ASSIGNOR TO THE BUNTING BRASS AND BRONZE COMPANY, OF TOLEDO, OHIO, A CORPORATION OF OHIO

FACING AND CHAMFERING MACHINE

Application filed July 14, 1930. Serial No. 467,908.

This invention relates generally to machines for facing and chamfering bushings and the like, and consists of certain novel features of construction, combinations and arrangements of parts that will be hereinafter more fully described and particularly pointed out in the appended claims.

In the accompanying drawings:

Figure 2 is an end elevation thereof;

Figure 3 is another end elevation of the machine;

Figure 4 is a horizontal sectional view taken on the line 4—4 of Figure 1;

Figure 5 is an enlarged fragmentary sectional view through the cutter head and showing the same in operative engagement with the work.

Figure 1:
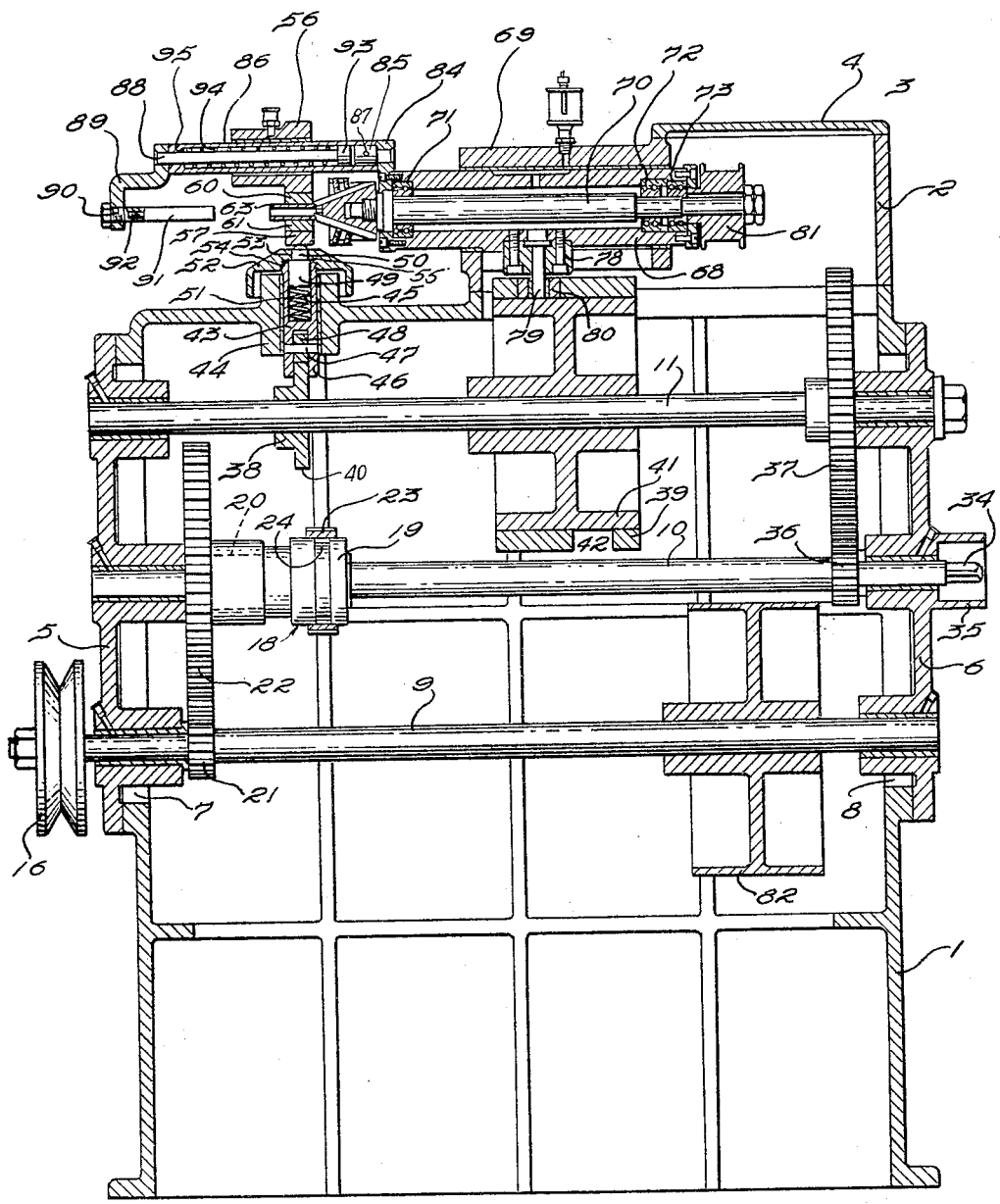
Figure 1 is a vertical sectional view through a machine embodying my invention.

Referring now to the drawings, 1 is a stationary frame or base; 2 is a head or cover section mounted upon the base and having an opening 3 in the top thereof; and 4 is a closure for the opening 3. 5 and 6 respectively are cover plates for openings 7 and 8 respectively in opposite upright walls of the base 1; 9, 10, and 11 respectively are vertically spaced shafts journaled in the cover plates 5 and 6; 12 is an electric motor supported upon a bracket 13 rigid with one side of the base 1 and having a shaft 14 projecting from one end thereof; 15 and 16 respectively are pulleys rigid with the respective shafts 14 and 9; 17 is an endless belt trained about said pulleys; and 18 is a clutch of conventional design upon the shaft 10 adjacent one end thereof. Preferably this clutch is a Johnson friction clutch and includes a peripherally grooved shiftable collar section 19 splined upon the shaft 10 and a cooperating hub section 20 loosely mounted upon the shaft 10 and adapted to be engaged by the shiftable collar section 19. 21 is a gear rigid with the shaft 9; and 22 is a gear rigid with the hub 20 and meshing with the gear 21. 23 is a yoke engaging the peripheral groove 24 in the collar section 19; 25 is a shifter lever pivoted at 26 upon a portion 27 of the base 1 and connected intermediate its ends to the yoke 23; 28 is a reciprocating rod connected to the free end of the shifter lever 25 and slidably mounted in aligned openings 29 and 30 respectively in opposite walls of the base 1; and 31 is an operating lever pivoted at one end upon a bracket 32 projecting laterally from an upright wall of the base 1 and connected adjacent the bracket to a projecting end portion of the reciprocating rod 28. Thus with this construction movement of the operating lever 31 from the full line to the dotted position (Figure 4) will cause the lever 25 and clutch section 19 to be moved to the left whereby an operative driving connection will be established between the hub 20 and shaft 10. However, when the clutch section 19 is disengaged from the hub section 20, the shaft 10 is idle but may be rotated by a suitable hand crank (not shown) applied to the squared end portion 34 of the shaft 10. Preferably this squared end portion 34 is within a tubular projection 35 of the cover plate 6.

36 and 37 respectively are gears rigid with the shafts 10 and 11 and meshing with each other, and 38 and 39 respectively are cams upon the shaft 11 at spaced points thereof. Preferably the cam 38 has a cam surface 40 at the periphery thereof, while the cam 39 is rigid with a pulley 41 non-rotatably secured to the shaft 11 and is provided with a cam groove 42. 43 is a sleeve movable vertically in an enlarged portion 44 of the base at a point directly above the cam 38 and provided at its opposite ends with a socket 45 and a bifurcated portion 46. 47 is a pin extending transversely of the bifurcated portion 46; 48 is a roller on the pin 47 and engaging the cam surface 40 of the cam 38; 49 is a plunger in the socket 45 and having a reduced head 50 above the upper end of the sleeve 43; 51 is a coil spring in the socket 45 between the base of the socket and the lower end of the plunger 49; and 52 is a dust shield threaded upon the sleeve 43 at the upper end thereof and having an opening 53 receiving the head 50 of the plunger 49. In this connection it will be noted that the lower face 54 of the dust shield 52 seats upon the upper end of the sleeve 43 and constitutes an abutment for the shoulder 55 of the plunger 49. As a result the outward upward movement of the head 50 is limited by the dust shield 52. 56 is a bracket rigidly mounted upon the top of the base 1 directly above the plunger 49; 57 is a slide movable vertically between laterally spaced guides 58 and 59 respectively on the bracket 56 and adapted to be actuated by the plunger head 50; and 60 and 61 respectively are ring segments rigid with the bracket 56 and slide 57 respectively and constituting cooperating sections of a work holder.

Located at one side of the work holder sections 60 and 61 is an inclined chute 62 for the work such as the bushings 63. Preferably the chute is pivoted at 64 upon the bracket 56 and is provided at its lower end with a stop or abutment (not shown) for the bushings. 66 is a screw threadedly engaging a lateral projection 67 on the bracket 56 and adapted upon rotation thereof to raise or lower the chute 62.

68 is a sleeve slidably mounted in a tubular portion 69 of the head 2; 70 is a rotatable spindle journaled in bearings 71, 72 and 73 respectively in the sleeve 68; 74 is a cutter head threaded upon the spindle 70 at the forward end thereof; 75, 76 and 77 respectively are cutters projecting forwardly from the head 74 for engagement with the work 63 held by the sections 60 and 61 of the work holder; 78 is a block bolted to the sleeve 68; 79 is a pin projecting downwardly from the block 78; and 80 is a roller on the pin 79 at the lower end thereof and engaging the cam slot 42 in the cam 39. 81 and 82 respectively are pulleys secured upon the spindle 70 and shaft 9 respectively; and 83 is a belt trained about said pulleys so that the spindle 70 rotates while the shaft 9 is rotating.

84 is a vertical plate bolted to the sleeve 68 and serving to retain the bearings 71 in the sleeve 68; 85 is a stud projecting laterally from and supported by the plate 84; 86 is a sleeve secured by a pin 87 upon the stud 85; 88 is a reciprocating safety plunger extending longitudinally of the sleeve 86; 89 is an arm rigid with the plunger 88 and extending downwardly therefrom; 90 is a socket member threadedly engaging the arm 89 at the lower end thereof and arranged substantially parallel to the safety plunger 88; 91 is a ram having a reduced threaded portion 92 engaging the socket member 90 and adapted to move bushings one at a time from the chute 62 to the space between the sections 60 and 61 of the work holder so that such bushings may be gripped by said sections and subsequently engaged by the cutters 75 to 77 inclusive carried by the revolving rotating cutter head 74; 93 is a piston rigid with the plunger 88 within the sleeve 86; and 94 is a coil spring surrounding the plunger 88 between the piston 93 and a shoulder 95 of the sleeve 86.

In use, the shaft 9, gears 21 and 22, clutch section 20, pulleys 82 and 81, and spindle 70 rotate constantly as long as the motor 12 is in operation. When the clutch section 19 is disengaged from the section 20, the shaft 10, gears 36 and 37 and shaft 11 are idle; however, such parts may be made to rotate by simply shifting the lever 31 to the dotted position (Figure 4) so that an operative driving connection is obtained between the sections 19 and 20 of the clutch. When the clutch sections 19 and 20 are in operative engagement, the cam 38 raises the sleeve 43 and causes the plunger 49 to raise the slide 57 and ring segment 61 so that a bushing such as 63 will be clamped against the ring segment 60. While the bushing 63 is held by the ring segments 60 and 61 the cam 39 will advance the sleeve 68, spindle 70 and cutter head 74 so that the cutters 75 to 77 inclusive will face and chamfer the adjacent end of the bushing 63. The forward movement of the sleeve 68 also causes the sleeve 86 to be moved forwardly so that the ram 91 is withdrawn from the clamped bushing 63 aforesaid sufficiently to permit a new bushing to roll down the chute against the stop 65 so that it may be engaged by the ram when the latter is moved rearwardly. The cam 38 then lowers the sleeve 43 and plunger 49 so that the slide 57 and ring segment 61 are lowered away from the ring segment 60. While the ring segment 61 is being lowered by the cam 38, the cam 39 moves the sleeve 68, spindle 70, cutter head 74, sleeve 86 and ram 91 rearwardly and causes the ram to push the new bushing from the stop 65 to the space between the separated ring segments 60 and 61. This movement of the new bushing causes the finished bushing to be discharged from the work holder onto a suitable chute such as the inclined portion 96 of the base, and continued operation of the machine causes all movements just described to be repeated.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a machine of the class described, a work holder, a reciprocating member upon one side of said holder, a rotating tool carried by said member and engageable with work in the holder, a reciprocating element upon the opposite side of the holder adapted to move work relative to the holder, and a connection between said element and member causing said element to reciprocate when said member reciprocates.

2. In a machine of the class described, a work holder, a rotary tool movable toward and away from the holder, a member for moving work relative to the holder, a support for the tool including a reciprocating member, and a connection between said reciprocating member and the member aforesaid causing the member aforesaid to move toward the holder so as to move work relative thereto when the tool is moved away from the holder, and causing the member aforesaid to move to inoperative position away from the holder when the tool is moved toward the holder.

3. In a machine of the class described, a work holder, a reciprocating sleeve adjacent the holder, a rotary spindle in the sleeve, a tool carried by the spindle, bearings for the spindle carried by the sleeve, a ram for moving work relative to the holder, and actuating means for the ram including a part rigid with said reciprocating sleeve and serving as a retainer for one of the bearings aforesaid for the spindle.

4. In a machine of the class described, a work holder, a reciprocating sleeve upon one side of the holder, including a sleeve secured to the reciprocating sleeve and movable therewith, a spring influenced safety plunger carried by the second sleeve, and a ram suspended from said safety plunger upon the opposite side of the work holder and adapted to move work relative thereto.

5. In a machine of the class described, a base having an enlargement, a sleeve slidable vertically in the enlargement, a dust shield carried by the sleeve and extending over the enlargement, and a work jaw actuating plunger movable longitudinally of the sleeve and limited by said dust shield when moved in one direction relative to said sleeve.

6. In a machine of the class described, a base, a head on the base, a reciprocating sleeve in the head, a rotary spindle journaled in the sleeve, a work engaging tool carried by the spindle, and means for moving the work towards said tool including means also carried by said sleeve.

7. In a machine of the class described, a pair of work engaging jaws, a work engaging tool upon one side of said jaws, a movable support for said tool, a reciprocating plunger upon the other side of said jaws adapted to move work into the jaws, and means for actuating said plunger including means spanning the space between said plunger and support and connected to the latter.

8. In a machine of the class described, a pair of work engaging jaws, a sleeve movable upon one side of said jaws, a work engaging tool carried by said sleeve and located between the latter and said jaws, a plunger upon the other side of said jaws adapted to move work into the jaws, and actuating means for the plunger including means spanning the space between the plunger and sleeve and connected to the latter.

9. In a machine of the class described, a work engaging jaw, a work engaging tool upon one side of said jaw, a movable support for the tool, means upon the other side of said jaw for moving work into engagement therewith, and an operating connection between said means and said support including means bridging said jaw.

10. In a machine of the class described, a work engaging jaw, a work engaging tool upon one side of said jaw, a support for said tool including a reciprocating sleeve, a plunger upon the other side of said jaw adapted to move work into engagement with the jaw, and a yieldable operating connection between said sleeve and plunger.

11. In a machine of the class described, a stationary bracket, a work engaging jaw associated with the bracket, a work engaging tool upon one side of the jaw, a support for the tool including a reciprocating member, means upon the other side of said jaw for moving work into engagement with the jaw, and a driving connection between said means and reciprocating member including means reciprocable in said bracket.

12. In a machine of the class described, a bracket, a work engaging jaw associated with the bracket, a work engaging tool upon one side of the jaw, a support for the tool including a reciprocating member, a sleeve slidably engaging the bracket and connected to the reciprocating member, a spring influenced piston reciprocating within the sleeve and having a stem projecting beyond one end of the latter, an arm connected to the stem, and a plunger carried by the arm and adapted to move work into engagement with the jaw.

13. In a machine of the class described, a work engaging jaw, a work engaging tool upon one side of the jaw, a support for the tool including a reciprocating sleeve, a rotary shaft within the sleeve and connected to the tool, bearings for said shaft within the sleeve, means upon the other side of said jaw for moving work relative thereto, and a connection between said means and sleeve including means retaining the bearings aforesaid within the sleeve.

14. In a machine of the class described, a work holder, a work engaging tool on one side of the holder, a movable support for the tool, a plunger on the other side of the holder for moving work into engagement with the holder, and a connection between said plunger and movable part including means for moving the tool away from the holder when the plunger is moved toward the holder and vice versa.

15. In a machine of the class described, a work holder, a tool upon one side of the holder and engageable with work in the holder, means in line with the tool for moving the same longitudinally toward and away from the holder, and reciprocating means upon the other side of the holder and operable by said last mentioned means when the tool is rendered inoperative for moving work into the holder.

16. In a machine of the class described, a work holder, a reciprocating sleeve adjacent the holder, a rotary spindle carried by the sleeve, a work engaging tool carried by the spindle, and means for moving work relative to the holder including means connected to and operable by said sleeve.

17. In a machine of the class described, a work holder, a reciprocating sleeve at one side of the holder, a rotary spindle in the sleeve, a tool carried by the spindle, a ram at the other side of the holder in substantial alignment with the tool, and actuating means for the ram including telescoping parts spanning the space between the sleeve and ram and respectively connected thereto.

18. In a machine of the class described, a frame, a bracket on the frame, a sleeve mounted for longitudinal movement on the frame, a spindle mounted for rotary movement in the sleeve, a work engaging tool carried by the spindle, and means for positioning the work to be engaged by the tool, including a reciprocating member in substantial alignment with the tool, and a connection between said reciprocating member and sleeve including a part slidably engaging the bracket.

19. In a machine of the class described, a work holder, a reciprocating sleeve at one side of the holder, a rotary shaft in the sleeve, a bearing for the shaft in the sleeve at one end of the latter, and means for moving work relative to the holder including a part connected to the reciprocating sleeve and retaining the bearing aforesaid therein.

20. In a machine of the class described, a work holder, a work engaging tool upon one side of the holder and engageable with the work in the holder, a member upon the other side of the holder for moving the work into engagement with the holder, a support for the tool capable of moving the tool to and from the holder, and a connection between the member and tool support adapted when the tool is moved toward the holder to move the member away from the holder and adapted when the tool is moved away from the holder to move the member toward the holder.

In testimony whereof I affix my signature.

GEORGE F. YAGER.